H. DANIEL.
STEERING DEVICE FOR DRAWING VEHICLES.
APPLICATION FILED SEPT. 25, 1919.

1,391,171. Patented Sept. 20, 1921.
2 SHEETS—SHEET 2.

UNITED STATES PATENT OFFICE.

HENRY DANIEL, OF KIEL, WISCONSIN, ASSIGNOR TO KIEL MACHINE CO., OF KIEL, WISCONSIN.

STEERING DEVICE FOR DRAWING-VEHICLES.

1,391,171.    Specification of Letters Patent.    Patented Sept. 20, 1921.

Application filed September 25, 1919. Serial No. 326,247.

*To all whom it may concern:*

Be it known that I, HENRY DANIEL, a citizen of the United States and resident of Kiel, in the county of Manitowoc and State of Wisconsin, have invented certain new and useful Improvements in Steering Devices for Drawing-Vehicles; and I do hereby declare that the following is a full, clear, and exact description thereof.
My invention relates to new and useful improvements in means for steering vehicles of that type provided with pivoted stub axle sections and which are drawn either by a draft animal or by an automobile truck or other vehicle.

In either instance, it is desirable to provide a certain degree of vertical pivotal movement of the draft tongue of the drawn vehicle, and in practice this vehicle movement of the tongue has been found to seriously interfere with the steering operation of the drawn vehicle by distorting the steering connections between the draft tongue and the steering axle sections. It is therefore primarily the object of my invention to provide a steering and draft arrangement for vehicles of this character wherein the draft tongue is permitted a certain desired amount of free vertical movement and wherein an efficient and positive connection is afforded for the stub axles of the vehicle to procure their turning movement upon horizontal swinging movement of the draft tongue.
It is further my object to provide an improved front axle construction for vehicles of the present character.

Figure 1:
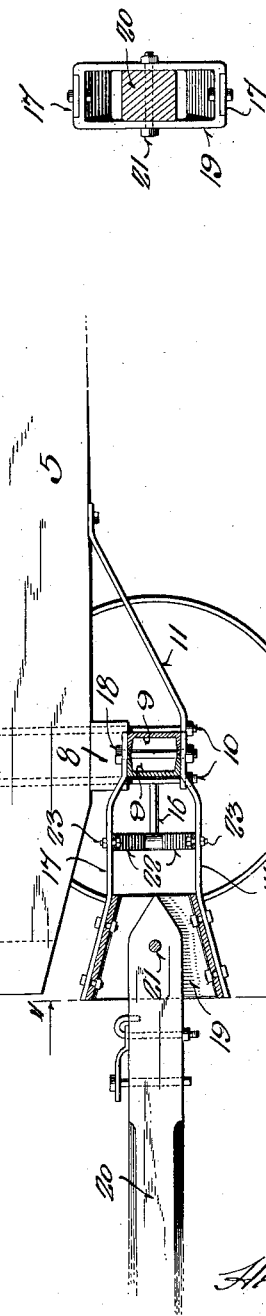
Figure 3:
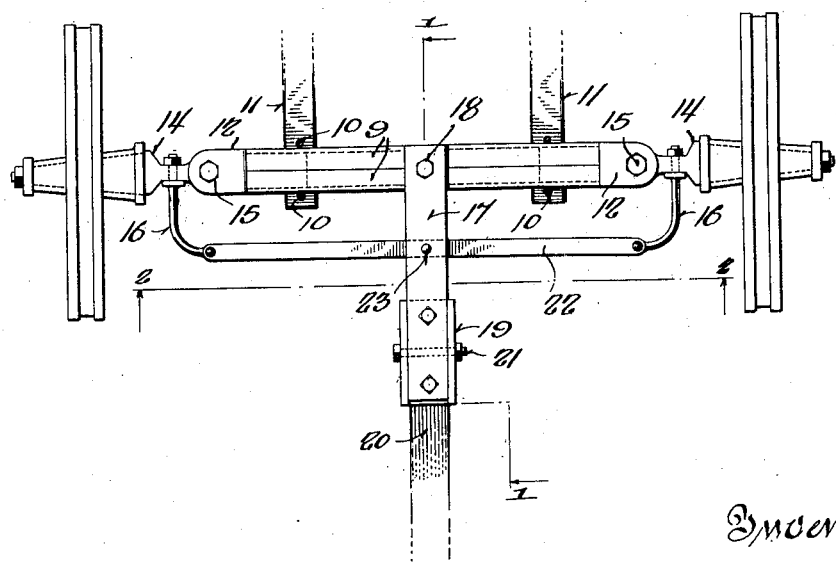

With the above and other objects and advantages in view, which will be apparent as the description proceeds, my invention resides in the novel features of construction, combination and arrangement of parts, which will be hereinafter more particularly described and defined by the appended claim.
In the accompanying drawings:

Figure 1 is a sectional view taken through the front axle structure of a vehicle embodying my invention, the plane of this section being indicated by the line 1—1 of Fig. 3.

Figure 2:
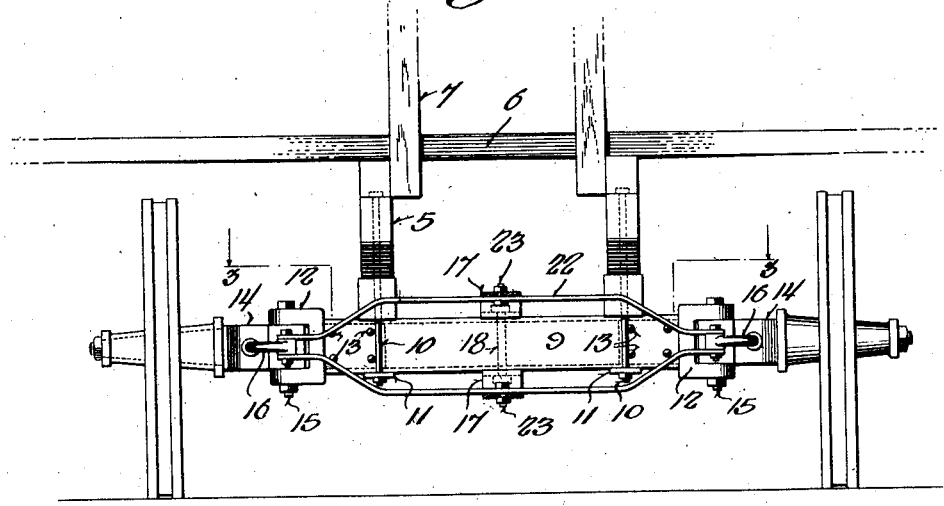

Fig. 2 is a sectional view through the tongue coupling on a plane indicated by the line 2—2 of Fig. 3, and showing the axle parts in elevation.
Fig. 3 is a horizontal sectional view through the axle structure on a plane indicated by the line 3—3 of Fig. 2, and Fig. 4 is a detail transverse sectional view through the draft tongue on a plane indicated by the line 4—4 of Fig. 1.

Referring now more particularly to the accompanying drawings, 5 designates the longitudinal frame-sills of a farm vehicle preferably of the rack type, said sills carrying the usual flooring 6 and rack posts 7. A bolster block 8 is disposed under the forward portion of each of the sills 5 and these blocks are engaged by the upper end portions of a hollow rigid axle which is formed by a pair of channel beams 9, the flanges of said beams being connected together in engaging relation. A pair of vertical connecting bolts 10 are passed through each sill and block 8, said bolts being extended at the front and rear sides of the axle and passed through the forward end portion of a brace link 11 which extends obliquely upward and rearward from the axle for connection with the vehicle frame sill, the forward end portion of this brace member thus comprising a tie plate for the bolts. The shanks of a pair of spindle yoke castings 12 are engaged in the ends of the axle member and bolts 13 are passed through the axle channels and through the yoke shanks to hold the parts in assembled relation. Wheeled stub axles 14 are mounted on spindle bolts 15 in said yokes, and these axle sections are provided with forwardly extending steering arms 16.

An exceedingly simple, compact and strong axle structure is thus provided.

A pair of axle connecting straps 17 have their rear ends mounted on a pivot bolt 18 passed through the central portion of the axle, and the forward ends of these bars are divergently inclined and bolted to the correspondingly divergent top and bottom portions of a vertically elongated socket casting 19. The draft tongue 20 of the vehicle has its inner end mounted on a pivot bolt 21 extending horizontally through the casting, and the rear portion of the draft tongue snugly fits against the sides of the socket casting whereby the draft tongue is permitted a certain desired degree of free vertical pivotal movement, but is held against lateral movement relative to the coupling unit which is constituted by the socket casting 19 and bars 17. A pair of upper and lower transverse links 22 are pivoted at 23 to the intermediate portions of the respective coupling bar 17, and the ends of these links 22 are inclined together and pivotally connected with the steering arm 16 of the stub axle.

Thus, horizontal movement of the draft tongue 20 to steer the vehicle will cause the coupling unit to swing on its pivot 18 and will swing the stub axles through the medium of the links 22, it being noted that the lengths of the links 22 are equal to the distance between the pivot axes of the stub axles, and this steering operation is effected without any interference with a desired degree of vertical pivotal movement of the draft tongue, to meet ordinary travel conditions.

While I have shown and described a preferred embodiment of my invention, it will be appreciated that various changes and modifications of structure may be employed to meet differing conditions of use and manufacture, without departing in any manner from the scope of the appended claim.

What is claimed is:

In a dirigible axle structure, the combination of a fixed axle, stub axles pivotally connected to the ends of the fixed axle and having steering arms extending forwardly, bowed companion links pivotally connected with the steering arms, companion bowed coupling arms pivotally connected to the upper and lower faces of the fixed axle centrally thereof and having their intermediate portions pivotally connected with the bowed companion links, said coupling bars terminating with divergent inclined faces, a hollow socket having companion divergent upper and lower walls, constituting seats for the divergent ends in rigid connection with the hollow socket head, and a tongue having its end in pivotal union with the socket head.

In testimony that I claim the foregoing I have hereunto set my hand at Kiel, in the county of Manitowoc and State of Wisconsin.

HENRY DANIEL.